United States Patent [19]

Leifeld

[11] Patent Number: 5,159,840
[45] Date of Patent: Nov. 3, 1992

[54] METHOD AND APPARATUS FOR MEASURING, REGULATING AND CONTROLLING THE QUANTITY OF FIBER TUFTS IN FLIGHT

[75] Inventor: Ferdinand Leifeld, Kempen, Fed. Rep. of Germany

[73] Assignee: Trüzschler GmbH & Co. KG, Mönchengladbach, Fed. Rep. of Germany

[21] Appl. No.: 481,595

[22] Filed: Feb. 20, 1990

[30] Foreign Application Priority Data

Feb. 20, 1989 [DE] Fed. Rep. of Germany ....... 3905139

[51] Int. Cl.⁵ .............................................. G01F 1/30
[52] U.S. Cl. ................................ 73/861.73; 73/160; 73/865.8
[58] Field of Search ................ 73/160, 866, 865.8, 73/861.73; 19/65 R, 65 A, 97.5

[56] References Cited

U.S. PATENT DOCUMENTS

| 2,057,641 | 10/1936 | Curley et al. | 19/65 |
| 3,140,604 | 7/1964 | Bernet | 73/160 |
| 4,157,661 | 6/1974 | Schindel | 73/861.73 |
| 4,354,622 | 10/1982 | Wood | 73/861.73 X |
| 4,440,029 | 4/1984 | Tomiyasu et al. | 73/861.73 |
| 4,614,122 | 9/1986 | Graves | 73/272 R X |
| 4,742,675 | 5/1988 | Leifeld | 19/105 X |
| 4,854,171 | 8/1989 | Hergeth | 73/572 |
| 4,987,646 | 1/1991 | Leifeld et al. | 19/97.5 |

FOREIGN PATENT DOCUMENTS

| 152388 | 8/1985 | European Pat. Off. |
| 158745 | 10/1985 | European Pat. Off. |
| 0169427 | 1/1986 | European Pat. Off. |
| 587674 | 11/1951 | Fed. Rep. of Germany . |
| 1160652 | 1/1965 | Fed. Rep. of Germany . |
| 1272012 | 7/1968 | Fed. Rep. of Germany ... 73/861.73 |
| 2102096 | 7/1972 | Fed. Rep. of Germany . |
| 2435677 | 3/1975 | Fed. Rep. of Germany . |
| 2346967 | 4/1975 | Fed. Rep. of Germany . |
| 2446910 | 4/1976 | Fed. Rep. of Germany . |
| 2908573 | 9/1979 | Fed. Rep. of Germany . |
| 2004394 | 7/1981 | Fed. Rep. of Germany . |
| 3218308 | 12/1982 | Fed. Rep. of Germany . |
| 3149715 | 6/1983 | Fed. Rep. of Germany ... 73/861.73 |
| 3337055 | 5/1985 | Fed. Rep. of Germany . |
| 3437696 | 6/1985 | Fed. Rep. of Germany . |
| 3425345 | 1/1986 | Fed. Rep. of Germany . |
| 3533917 | 7/1986 | Fed. Rep. of Germany . |
| 3529184 | 2/1987 | Fed. Rep. of Germany . |
| 2024086 | 8/1970 | France . |
| 2556108 | 6/1985 | France . |
| 80556 | 3/1971 | German Democratic Rep. |
| 101754 | 11/1973 | German Democratic Rep. |
| 8901133 | 2/1989 | PCT Int'l Appl. . |
| 664034 | 5/1979 | U.S.S.R. | 73/861.73 |
| 1199075 | 7/1970 | United Kingdom . |
| 1225912 | 3/1971 | United Kingdom . |
| 1419868 | 12/1975 | United Kingdom . |
| 1537785 | 1/1979 | United Kingdom . |
| 2020038 | 11/1979 | United Kingdom . |

Primary Examiner—Tom Noland
Attorney, Agent, or Firm—Spencer, Frank & Schneider

[57] ABSTRACT

An apparatus for measuring the quantity of fiber tufts during flight thereof, having an impact element provided with an impact face arranged in the flow path of the fiber tuft stream and being exposed for collision with the fiber tufts. The impact face is situated at an oblique angle to the flow direction of the fiber tufts. There is further provided a measuring element operatively connected to the impact element for generating signals representing stresses or excursions of the impact element derived from the collision of fiber tufts with the impact face. An electronic evaluating device is connected to the measuring element for receiving signals therefrom.

4 Claims, 6 Drawing Sheets

METHOD AND APPARATUS FOR MEASURING, REGULATING AND CONTROLLING THE QUANTITY OF FIBER TUFTS IN FLIGHT

CROSS REFERENCE TO RELATED APPLICATION

This application claims the priority of Federal Republic of Germany Application No. P 39 05 139.0 filed Feb. 20th, 1989, which is incorporated herein by reference.

BACKGROUND OF THE INVENTION

This invention relates to a method and an apparatus for measuring a stream of fiber tufts as it is advanced, for example, in a pneumatic conveyor duct in a spinning preparation plant. The fiber tufts pass by a measuring station which forms a measuring value subsequently applied to an electronic evaluating device for regulating or controlling th quantity of the fiber tufts in flight.

In order to regulate or control the flow of materials (such as fiber tuft streams) sensors have been needed which determine the passage of material and setting members which vary the throughput. In a known method flow-through scales or weighing plates have been used as sensors. As setting members rpm-variable drive motors are used which drive the conveyor rollers for the material. Such sensors, however, are not adapted for use in certain machines or systems because the sensors are incapable of measuring the fiber tufts in flight. Also, scale systems often may not be used because of lack of space.

According to another process, sensors are used which optically detect the fiber tufts in flight and the throughput is calculated by an electronic evaluating device. Such a system, however, was not found to be operationally satisfactory because no positive and sufficiently throughput-analogous correlations exist. According to still another known process, the conveying air stream is sensed by a pressure sensor and the pressure is monitored. The material throughput is determined from pressure and air speed changes which are representative of the material contents of the air flow. Such a system too has proven to be unusable.

Yet another proposal suggests a periodical deflection of the fiber tuft stream from the conveying duct, a separation of the tufts from the air stream and a weighing of the separated fiber tufts. For a given period of observation then the weight of the material is supposed to be determined. With such a system one may arrive at a long-range throughput under the assumption that the material stream varies only slightly in time. Such a system, however, is inaccurate and is not adapted for machine controls which are to ensure a disturbance-free operation.

All the above-outlined proposals have the particular disadvantage that they do not make possible an accurate measurement of the fiber tuft stream in a predetermined period and may not be used at any location where fiber tuft streams in fiber processing (spinning preparation) machines are present.

SUMMARY OF THE INVENTION

It is an object of the invention to provide an improved method and apparatus for measuring the quantity of a stream of fiber tufts in flight from which the discussed disadvantages are eliminated and which permit in particular an accurate measurement of the fiber tuft stream and the performance of the measurement at a location wherever fiber tufts are in flight in the spinning preparation machine or processing line.

This object and others to become apparent as the specification progresses, are accomplished by the invention, according to which, briefly stated, the fiber tufts are caused to impinge on one side (that is, the impingement or impact face) of an impact element whose stress or excursion is measured. The fiber tuft stream is deflected from the impingement side of the impact element to continue its advance.

As the fiber tufts collide according to the invention, with an impact element, each collision is detected and measured. Such measurement may be effected at any location in which the fiber tufts are in flight. Thus, the fiber stream may be measured in conduits and it also can be measured during a free fall or free flight. The stress or displacement (excursion) of the impact element is measured and is integrated over a determined time period and the measuring value is utilized to control the fiber material throughput with regulating and control devices.

The apparatus according to the invention comprises an impact element which functions as a measuring element with which there is associated a stress or excursion measuring element. The impact element is arranged at an angle relative to the flow direction of the fiber tufts. The fiber stream is directed at an angle onto a detector plate which deflects the fiber material stream. The detector plate is exposed to an input and output pulse whose difference exerts a measuring force on the plate. The measuring magnitude is proportional to the pulse difference which is obtained by a vectorial subtraction of the output pulse from the input pulse. The pulse is proportionate to the product m×v. The velocity of the fiber tufts is of significance; the velocity is dependent from the air speed which, however, also represents a noise signal. In order to reduce its influence, it is measured either before or after the measuring location for the material throughput. The result of the air speed measurement (a mean magnitude may also be taken such as the air throughput) in the measuring evaluation is inputted and processed for correction.

BRIEF DESCRIPTION OF THE DRAWING

FIG. 2b is a perspective view of the embodiment illustrated in FIG. 2a.

FIG. 7b is a schematic top plan view of the embodiment illustrated in FIG. 7a.

DESCRIPTION OF THE PREFERRED EMBODIMENTS

Figure 1:
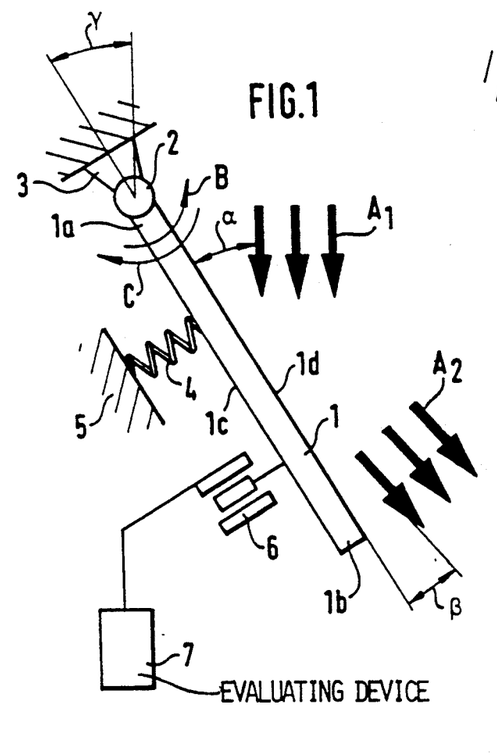
FIG. 1 is a schematic side elevational view of a preferred embodiment of the invention.

Turning to FIG. 1, there is shown therein an impact element 1 constituted by a measuring plate which is, at one end 1a supported in a pivot 2 affixed to a stationary part at 3. The other end 1b of the impact element 1 is free. The impact element 1 is oriented downwardly at an angle Y to the vertical. The side 1c of the impact element 1 is engaged by a compression spring 4 which is countersupported by a stationary part 5. With the side 1c there is further associated an inductive path sensor 6 which is connected with an electronic evaluating device 7.

The fiber tuft stream $A_1$ impinges from above under an angle $\alpha$ on the impact face 1d of the impact element 1 and is deflected thereby to continue its flow at an angle $\beta$ to the plane of the impact element 1 as a fiber tuft stream $A_2$. By the force derived from the impingement of the fiber tufts on the impact plate 1, the latter is displaced against the force of the spring 4 in the direction of the arrow C. Such an excursion is detected by the path sensor 6 which applies a corresponding electric signal to the evaluating device 7. After impingement, the impact element 1 is returned to its position of rest by the force of the spring 4 in the direction of the arrow B.

Figure 2A:
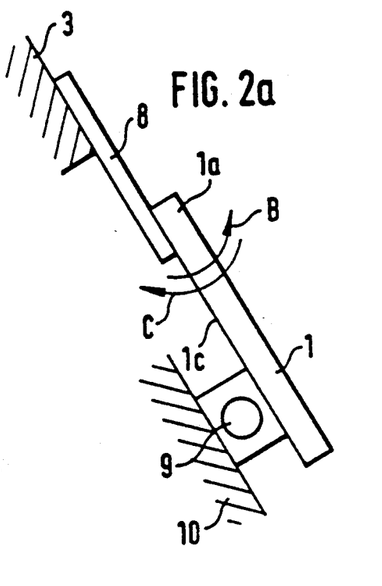
FIG. 2a is a schematic side elevational view of another preferred embodiment of the invention.
Figure 2B:
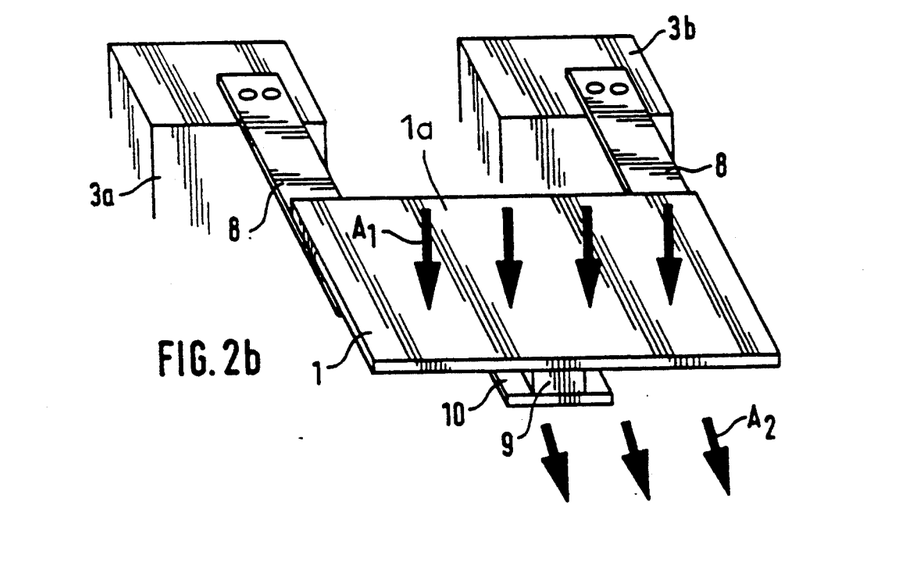

Turning to FIGS. 2a and 2b, the impact element 1 is, at its end 1a connected to a fixed location 3 by means of leaf springs 8 which serve as holding and guiding elements. The side 1c of the impact element 1, that is, the reverse face as related to the impact face 1d, is coupled to a force measuring box 9 supported on a surface of a fixed location 10. In the force measuring box 9 conventional expansion measuring strips are disposed. FIG. 2b illustrates the incident and reflected fiber tuft streams $A_1$ and $A_2$, respectively.

Figures 3A, 3B:
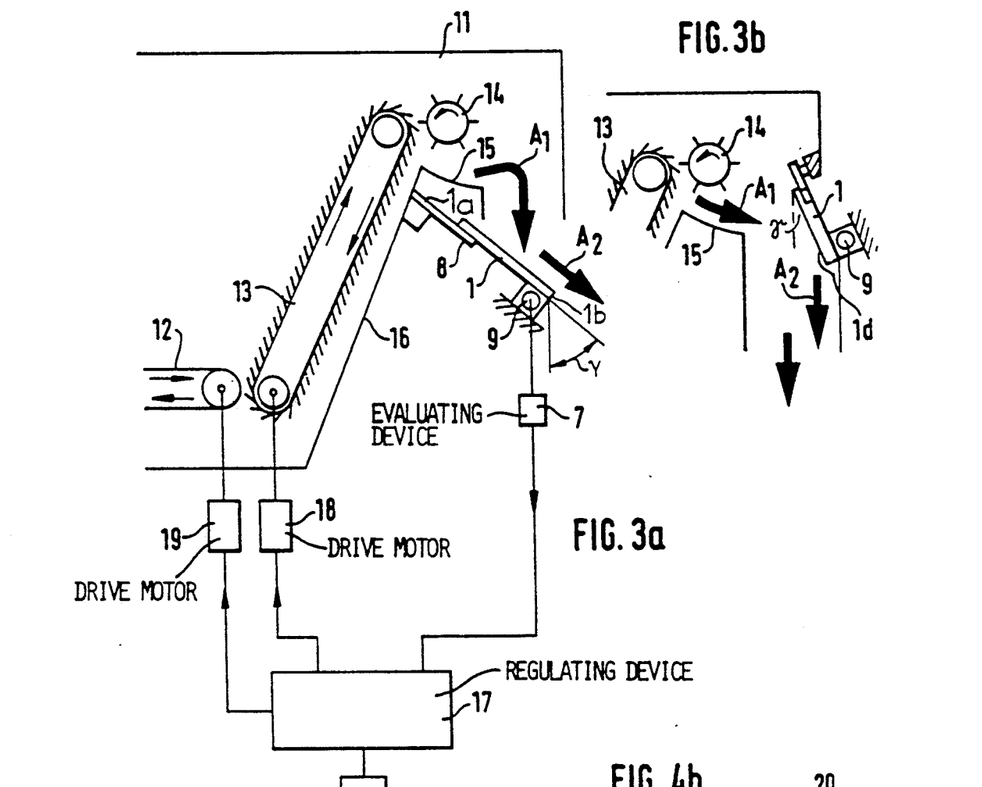
FIG. 3a is a schematic side elevational view, with block diagram, of an apparatus incorporating the embodiment illustrated in FIGS. 2a and 2b.
FIG. 3b is a fragmentary schematic side elevational view of a modified apparatus incorporating the embodiment shown in FIGS. 2a and 2b.

Turning to FIG. 3a, there is shown therein a known fiber tuft feeder 11 which includes a supply conveyor belt 12, a spiked lattice 13 and a stripper roller 14. Underneath the stripper roller 14 a bent guide plate 15 is secured to a side wall 16 of the feeder 11 for advancing the stripped fiber tufts. To the side wall 16 there is further secured one end 1a of the impact element 1 by means of a leaf spring in such a manner that the other end 1b of the impact element 1 projects beyond the guide plate 15 downwardly at an angle $\gamma$ to the vertical. The force-measuring box 9 is connected with a control and regulating device 17 with the intermediary of an evaluating device 7 which forms a mean value and performs integration of the measured values. The control and regulating device 17 applies signals to a regulatable drive 18 for the spiked lattice 13 and a regulatable drive 19 for the supply conveyor 12. The speed of the conveyor 12 and the spiked lattice 13 is thus regulated as a function of the fiber tuft throughput measured by the components 1, 7. The fiber tuft stream $A_1$ impinges in a free fall onto the impact element 1 and is deflected thereby obliquely downwardly as a fiber tuft stream $A_2$. The angle which the direction of the deflected stream $A_2$ forms with the surface of the impact element 1 may be zero or close to zero in case of small impingement forces.

Turning now to FIG. 3b, the impact element 1 is arranged laterally relative to the guide plate 15. The incident fiber tuft stream $A_1$ impinges in free flight approximately horizontally onto the side 1d of the impact element 1 which is oriented at an angle $\gamma$ to the vertical. The fiber tufts are, by the impingement face 1d of the impact element 1, deflected downwardly in the vertical direction to continue its travel as the deflected fiber tuft stream $A_2$.

Figure 4A:
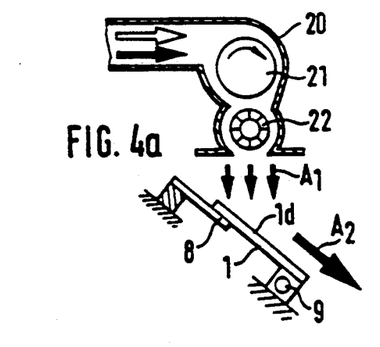
FIG. 4a is a schematic side elevational view of still another apparatus incorporating the embodiment shown in FIGS. 2a and 2b.

FIG. 4a shows a known condenser 20 having a rotating screen drum 21 and a blower roller 22. Underneath the blower roller 22 there is arranged the impact element 1 at a downward inclination. The fiber tuft stream $A_1$ impinges in a free fall on the face 1d of the impact element 1 and is deflected thereby to continue its flow as the fiber tuft stream $A_2$. In the arrangement according to FIG. 4b the force-measuring box 9 of the impact element 1 arranged underneath the condenser 20 applies signals to the evaluating device 7 to control a regulatable drive arrangement 23 such as an electromotor to drive the take-in rollers 24c, 24d of an opening and cleaning machine 24 with the intermediary of the control and regulating device 17. The machine 24 which has a sawtooth roller 24b, may be an RSK model, manufactured by Trützschler GmbH & Co. KG, Mönchengladbach, Federal Republic of Germany.

Figure 4B:
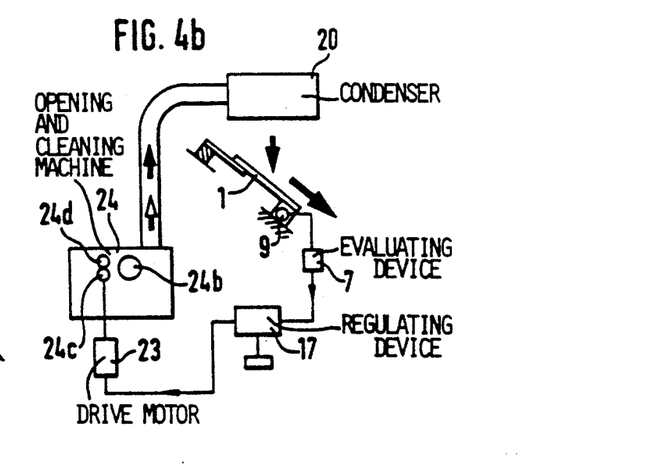
FIG. 4b is a schematic side elevational view, with block diagram, of an apparatus incorporating the embodiment of the invention illustrated in FIGS. 2a and 2b.
Figure 4C:
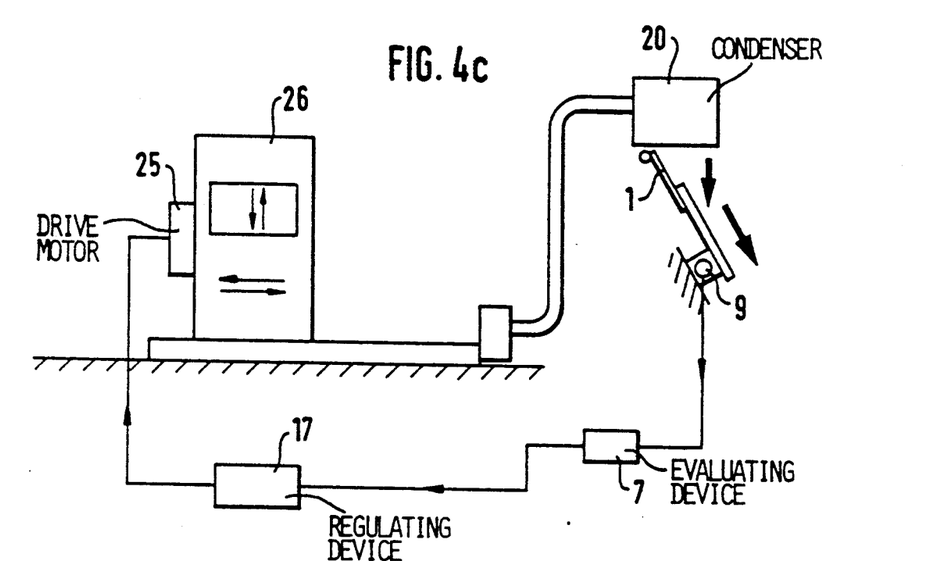
FIG. 4c is a schematic side elevational view, with block diagram, of a further apparatus associated with the embodiment illustrated in FIGS. 2a and 2b.

Turning to FIG. 4c, there is illustrated therein an arrangement similar to that shown in FIG. 4b in which, however, the control and regulating device 17 is connected with the regulatable drive motor 25 of a bale opener 26 which is arranged operationally upstream of the condenser 20 and which may be a BLENDOMAT BDT model, manufactured by Trützschler GmbH & Co. KG.

Figures 5A, 5B:
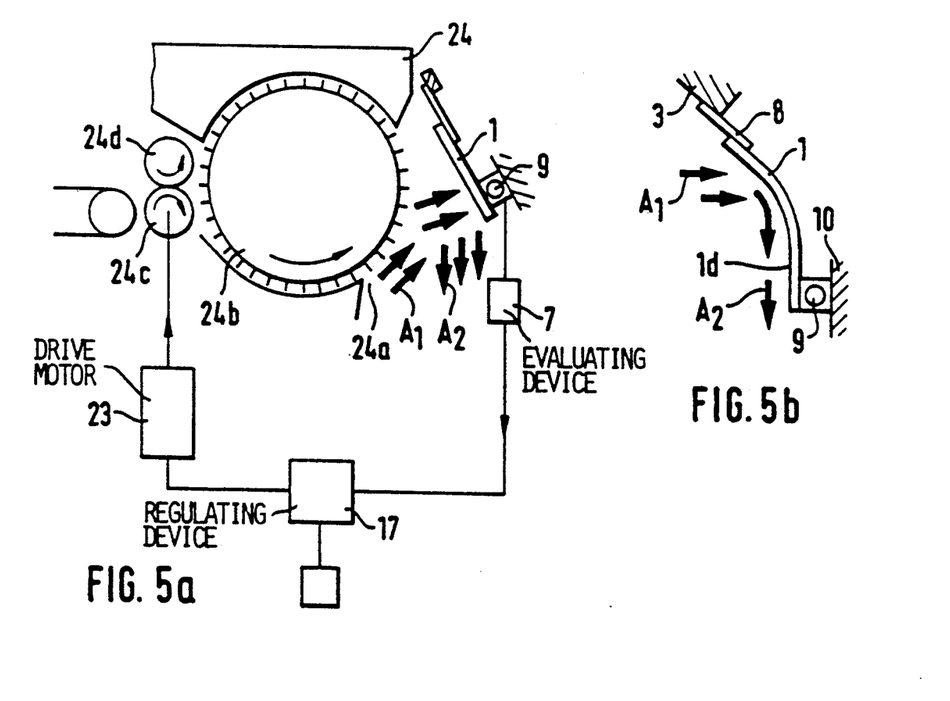
FIG. 5a is a schematic side elevational view, with block diagram, of an apparatus incorporating the embodiment of the invention shown in FIGS. 2a and 2b.
FIG. 5b is a schematic side elevational view of still a further embodiment of the invention.

In FIG. 5a, a sawtooth cleaner, such as the earlier-noted RSK model is provided whose housing has an opening 24a for the discharge of the fiber tufts thrown outwardly by the sawtooth roller 24b. The impact element 1 faces the opening 24a and is oriented at a downward inclination.

FIG. 5b shows the impact element 1 as being constituted by a curved plate and the incident fiber tuft stream $A_1$ impinges on the concave side thereof and is deflected downwardly to form a fiber tuft stream $A_2$.

Figure 6:
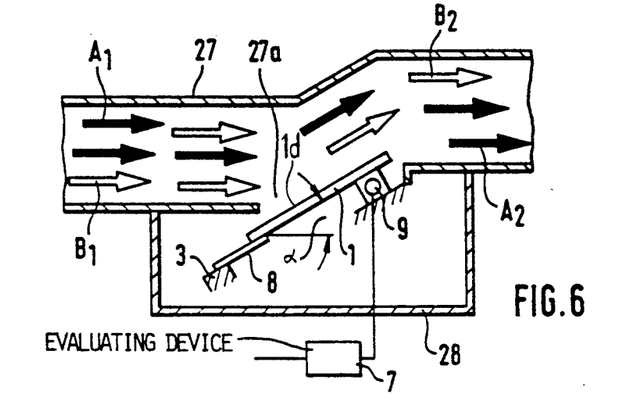
FIG. 6 is a schematic side elevational view of a conveyor duct accommodating the embodiment of the invention shown in FIGS. 2a and 2b.

Turning to FIG. 6, there is shown a horizontal duct 27 for the pneumatic transport of fiber tufts. The conveying air stream is generated by a non-illustrated blower. The lower zone of the duct 27 has a wall opening 27a covered by an externally located box 28 which houses the impact element 1. The latter is arranged in the opening 27a and is oriented at an angle $\alpha$ with respect to the flow direction of the tuft stream $A_1$. The fixed location 3 and the leaf spring 8 which supports the impact element 1 are supported in the box 28, while the impact element 1 projects into the inner space of the conveying duct 27. The stream composed of a mixture of fiber tufts $A_1$ (solid arrows) and air $B_1$ (outlined arrows) impinges on the side 1d of the impact element 1 and is deflected thereby as a mixture of fiber tufts $A_2$ and air $B_2$.

Figure 7A:
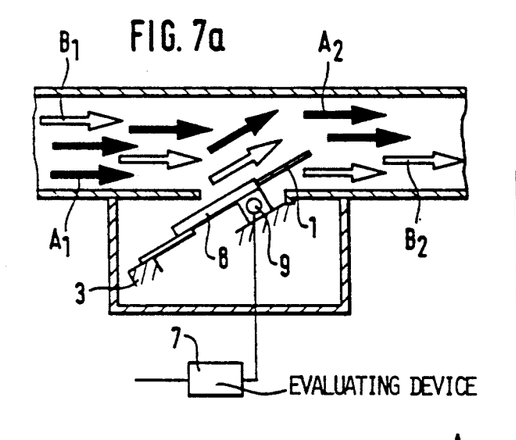
FIG. 7a is a schematic side elevational view of a transport duct incorporating still a further embodiment of the invention.
Figure 7B:
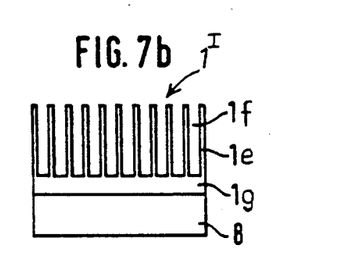

According to FIG. 7a, the impact element $1^I$ is a combshaped construction shown in top plan view in FIG. 7b. Between the tines 1e narrow slots 1f are defined whose width is smaller than the dimensions of the fiber tufts so that the latter are, upon impact, retained by the tines 1e whereas the conveying air is allowed to pass through the slots 1f. The tines 1e are, at one end, supported in a holder 1g which is mounted on the leaf spring 8. The force-measuring box 9 is arranged underneath the holder 1g.

Figure 8:
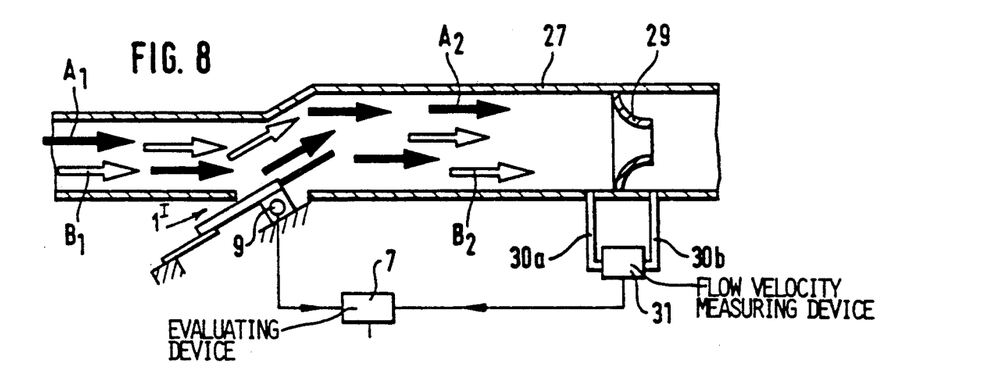
FIG. 8 is a schematic side elevational view of the embodiment according to FIG. 6 or FIG. 7a with means for additional measurements.

In the embodiment illustrated in FIG. 8, a nozzle 29 is arranged downstream of the comb-like impact element $1^I$, within the fiber tuft conveying duct 27. Upstream and downstream of the nozzle 29 air conduits 30a and 30b merge into the conveyor duct 27 through appropriate apertures in the wall thereof. The conduits 30a, 30b are coupled to a device 31 for measuring the flow velocity. The device 31 is, similarly to the force-measuring box 9, coupled to the evaluating device 7 to apply sensor signals thereto.

Figure 9:
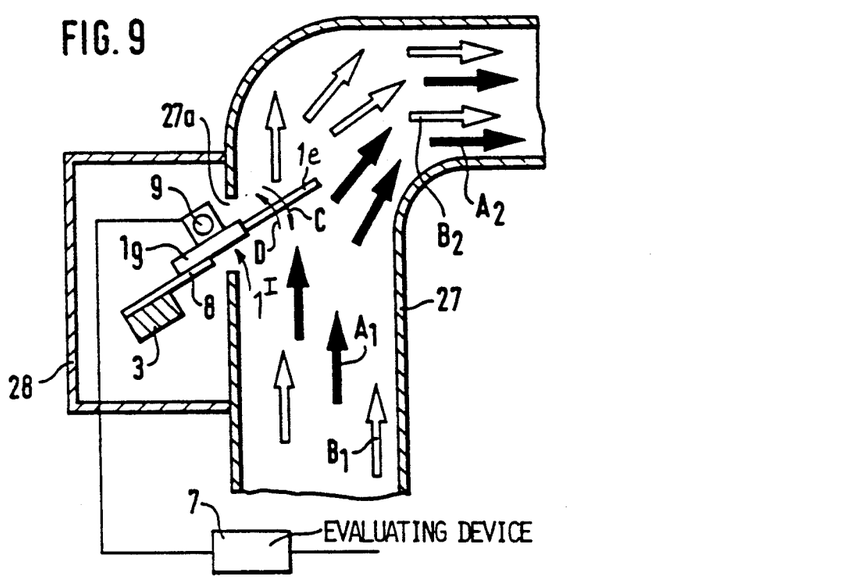
FIGS. 9 and 10 are schematic side elevational views of a conveyor duct, shown in different orientations, accommodating yet another preferred embodiment of the invention.

Turning to FIG. 9, there is shown a bent conveyor duct 27 having a vertical ascending portion which, after the bend, continues in a horizontal part. Approximately at the end of the ascending part, the vertical duct wall has an opening 27a through which the comb-shaped impact element $1^I$ extends, whose holder 1g, leaf spring 8, support 3 and force-measuring box 9 are accommodated in a box 28 attached to the exterior of the duct 27. The tines 1e of the impact element $1^I$ are oriented obliquely upwardly and are situated inside the duct 27. The tines 1e deflect the fiber tufts $A_1$ into the through the slots defined between the tines. In the horizontal part of the duct 27 there travels the fiber tuft and air mixture $A_2$, $B_2$. Upon impingement of the fiber tufts $A_1$ onto the tines 1e the impact element $1^I$ is deflected in the direction of the arrow D, whereupon the force-measuring box 9 senses a force in response to which an electrical signal is generated and applied to the evaluating device 7.

Figure 10:
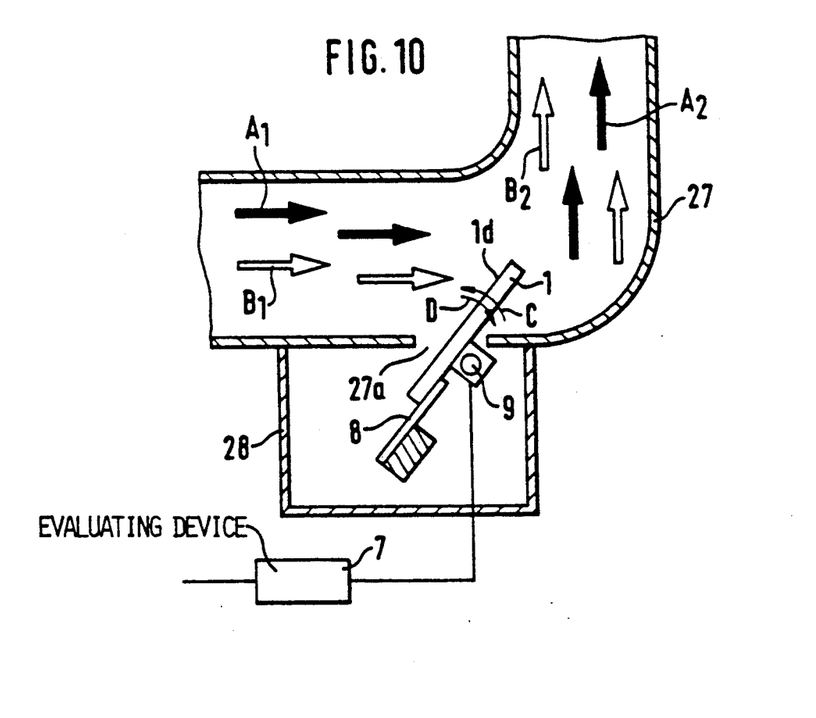

Turning to FIG. 10, the impact element 1 extends through the opening 27a of the duct 27 obliquely upwardly in the horizontal portion of the duct 27. The fiber tuft and air mixture $A_1$, $B_1$ travels in the horizontal portion and impinges on the impact face 1d and is deflected in the direction of the vertical part of the duct 27. Upon impingement of the stream on the impact element 1, the latter is stressed in the direction of the arrow D.

Figure 11:
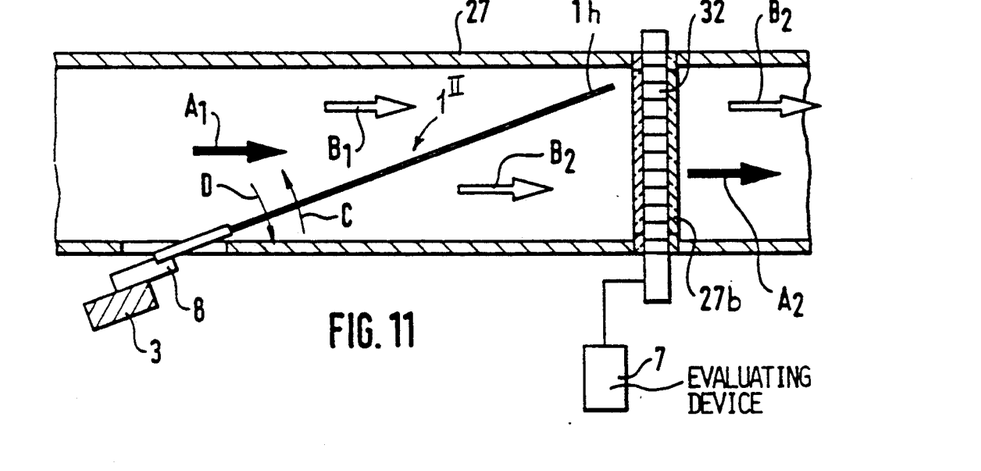
FIG. 11 is a schematic side elevational view of yet another embodiment of the invention.

Turning now to FIG. 11, the impact element $1^{II}$ extends from the lower zone of the duct wall diagonally to the upper zone thereof. In the zone of the free end 1h of the impact element $1^{II}$ there is provided in the wall of the conduit 27 a transparent zone 27b, for example, of Plexiglas or the like and is associated with an optical device 32 formed of a series of side-by-side arranged photocells 32a ... 32n which apply signals to the evaluating device 7. Upon impingement of fiber tufts $A_1$ on the comb-like impact element $1^{II}$, the latter alters its position relative to the photocells 32a ... 32n; this positional change is sensed by the evaluating device 7. Further, a shadow effect may be detected which is caused by the fiber tufts $A_1$ on the photocells 32a ... 32n between the comb-like impact element $1^{II}$ and the upper zone of the conduit 27.

Figure 12:
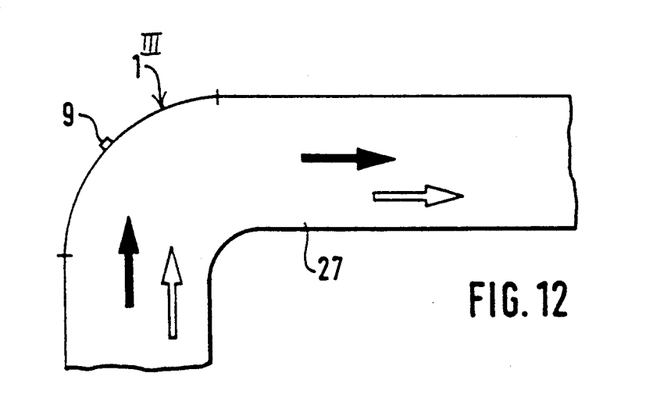
FIG. 12 is a schematic side elevational view of a further embodiment of the invention.

Turning now to FIG. 12, the duct 27 is in the outer curve of its bend made of a resilient material such as rubber. This resilient zone forms an impact element $1^{III}$ which thus constitutes a portion of the wall of the duct 27. On the outer face of the impact element $1^{III}$ there is arranged a sensor 9' which detects displacements of the impact element $1^{III}$ as the fiber tufts impinge thereon at the inside.

Figure 13A:
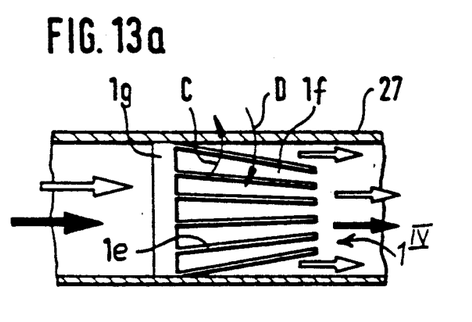
FIG. 13a is a schematic side elevational view of yet another embodiment of the invention.

Turning now to FIG. 13a, there is illustrated a duct 27 in which there is disposed an impact element $1^{IV}$ having a plurality of tines 1e which are spacedly supported at one end by a holder 1g and which converge in the direction of the stream flow. Thus, the tines 1e, as viewed in their totality, are arranged in a frustoconical configuration. Between the tines 1e clearances or slots 1f are defined. Thus, the tines 1e are arranged at an angle to the direction of the central axis of the duct 27 whereby the inlet cross-sectional area of the frustoconical impact element $1^{IV}$ is greater than the cross-sectional outlet area. As a result, the tines 1e flex outwardly as the fiber tufts, flying within the frustoconical impact element $1^{IV}$, impinge on the tines 1e.

Figure 13B:
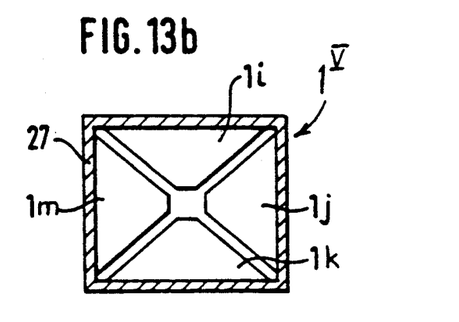
FIG. 13b is an end elevational view of yet another preferred embodiment of the invention.

In FIG. 13b, the impact element $1^V$ is a modification of the embodiment shown in FIG. 13a in that there are provided four generally triangular impact plates 1i, 1j, 1k and 1m which are attached to a fixed location along their base so that each may execute a swinging motion. The four impact plates are arranged at an inclination inside a quadratic duct 27 to form a truncated pyramid and are oriented in the direction of the stream flow. The deflection or stress of the tines (FIG. 13a) or plates (FIG. 13b) is measured by force-measuring boxes or inductive path sensors and a corresponding electric signal is applied to the evaluating device 7.

I will be understood that the above description of the present invention is susceptible to various modifications, changes and adaptations, and the same are intended to be comprehended within the meaning and range of equivalents of the appended claims.

What is claimed is:

1. An apparatus for measuring the quantity of fiber tufts during flight thereof in a fiber tuft stream having a direction of flow, comprising
    (a) an impact element having an impact face arranged in the flow path of the fiber tuft stream and being exposed for collision with the fiber tufts; said impact face being situated at an oblique angle to said direction of flow; said impact element comprising a comb-shaped component having a plurality of parallel-extending tines spaced sufficiently closely to prevent the fiber tufts from passing therebetween;
    (b) a measuring element operatively connected to said impact element for generating signals induced by the collision of fiber tufts with said impact face; and
    (c) an electronic evaluating device connected to said measuring element for receiving said signals.

2. An apparatus for measuring the quantity of fiber tufts during flight thereof in a fiber tuft stream having a direction of flow and being composed of an air stream and fiber tufts entrained by the air stream, comprising (a) an impact element having an impact face arranged in the flow path of the fiber tuft stream and being exposed for collision with the fiber tufts; said impact face being situated at an oblique angle to said direction of flow;

(b) a measuring element operatively connected to said impact element for generating first signals induced ty the collision of fiber tufts with said impact face;

(c) an air flow measuring device arranged in the path of the air stream and generating second, air flow measuring signals; and (d) an electronic evaluating device connected to said measuring element and said air flow measuring device for receiving said first and second signals.

3. An apparatus for measuring the quantity of fiber tufts during flight thereof in a fiber tuft stream having a direction of flow, comprising (a) an impact element having an impact face arranged in the flow path of the fiber tuft stream and being exposed for collision with the fiber tufts; said impact face being situated at an oblique angle to said direction of flow; said impact element comprising a comb-shaped component having a plurality of par-alklel-extending tines spaced sufficiently closely to prevent the fiber tufts from passing therebetween;

(b) a measuring element operatively connected to said impact element for generating signals representing one of stresses and excursions of said impact element derived from the collision of fiber tufts with said impact face;

(c) an electronic evaluating device connected to said measuring element for receiving said signals; and (d) control means operatively connected to said electronic evaluating device for varying a flow rate of the fiber tuft stream as a function of said signals.

4. An apparatus for measuring the quantity of fiber tufts during flight thereof in a fiber tuft stream having a direction of flow and being composed of an air stream and fiber tufts entrained by the air stream, comprising (a) an impact element having an impact face arranged in the flow path of the fiber tuft stream and being exposed for collision with the fiber tufts; said impact face being situated at an oblique angle to said direction of flow;

(b) a measuring element operatively connected to said impact element for generating first signals representing one of stresses and excursions of said impact element derived from the collision of fiber tufts with said impact face;

(c) an air flow measuring device arranged in the path of the air stream and generating second, air flow measuring signals;

(d) an electronic evaluating device connected to said measuring element and said air flow measuring device for receiving said first and second signals; and (e) control means operatively connected to said electronic evaluating device for varying a flow rate of the fiber tuft stream as a function of said signals.

* * * * *